United States Patent [19]

Kamada

[11] Patent Number: 5,253,997
[45] Date of Patent: Oct. 19, 1993

[54] INJECTION MOLDING MACHINE FOR MOLDING DISK-SHAPED RECORDING MEDIUM CARRIERS

[75] Inventor: Koichi Kamada, Chiba, Japan

[73] Assignee: Sumitomo Heavy Industries, Ltd., Tokyo, Japan

[21] Appl. No.: 17,436

[22] Filed: Feb. 12, 1993

Related U.S. Application Data

[63] Continuation of Ser. No. 758,519, Sep. 6, 1991, abandoned, which is a continuation of Ser. No. 412,754, Sep. 26, 1989, abandoned.

[30] Foreign Application Priority Data

Sep. 30, 1988 [JP] Japan .................. 63-246792

[51] Int. Cl.$^5$ .......................................... B29C 45/38
[52] U.S. Cl. ........................ 425/556; 249/68; 264/155; 264/161; 264/334; 425/577; 425/810
[58] Field of Search .................. 264/155, 161, 334; 425/290, 292, 438, 444, 553, 554, 556, 577, 810; 249/67, 68

[56] References Cited

U.S. PATENT DOCUMENTS

| | | | |
|---|---|---|---|
| 2,613,395 | 10/1952 | Massler | 264/37 |
| 4,085,178 | 4/1978 | McNeely | 425/810 |
| 4,185,955 | 1/1980 | Holmes et al. | 425/542 |

FOREIGN PATENT DOCUMENTS 247244  2/1987  European Pat. Off. .

Primary Examiner—Tim Heitbrink
Attorney, Agent, or Firm—Nikaido, Marmelstein, Murray & Oram

[57] ABSTRACT

An injection molding machine employing a mold for molding, e.g., disk-shaped recording medium carriers. A mold-mounting plate has a front surface allowing the mold to be the mounted thereon. A gate-cutting punch is slidably inserted in a hole extending through the plate and opening in the front and rear surfaces of the plate. A bore extends longitudinally in the center of the punch, and an ejector pin is slidably inserted in the bore. A gate-cutting drive cylinder is mounted on the rear surface of the mold-mounting plate, and has a piston capable of abutting against the rear end of the gate-cutting punch. The piston is formed with a stepped bore having a large-diameter front portion and a small-diameter rear portion which are aligned on the same axial line. An ejector rod extends through the stepped bore, and has a large-diameter portion slidable within the large-diameter portion of the stepped bore, the front end of the ejector rod being capable of abutting against the rear end of the ejector pin. A sprue-ejecting drive cylinder is provided behind the gate-cutting drive cylinder on the same axial line, and has a piston rod connected to the rear end of the ejector rod. Thus, the machine includes no hydraulic cylinders incorporated in the mold, thereby eliminating various drawbacks conventionally encountered.

2 Claims, 2 Drawing Sheets

INJECTION MOLDING MACHINE FOR MOLDING DISK-SHAPED RECORDING MEDIUM CARRIERS

This application is a continuation, of application Ser. No. 758,519 filed Sep. 6, 1991 now abandoned, which in turn is a continuation of application Ser. No. 412,754, filed Sep. 26, 1989, now abandoned.

BACKGROUND OF THE INVENTION

1. Field of the Invention

The present invention relates to an injection molding machine and, more particularly, to an injection molding machine including a mold for molding disk-shaped recording medium carriers such as optical disk substrates (hereinafter abbreviated to "optical disk substrates").

2. Description of the Prior Art

A conventional mold for molding optical disk substrates includes an ejector rod for ejecting a molded substrate, a gate-cutting punch, and an ejector pin for ejecting a sprue. The substrate-ejecting ejector rod is movably fitted in the main body of the mold while facing the cavity. The gate-cutting punch and the sprue-ejecting ejector pin are movably fitted within the ejector rod while concentrically engaging with each other in such a manner as to be movable relative to each other. The conventional mold also incorporates therein a pneumatic cylinder to actuate mechanisms for ejecting the substrate and a hydraulic cylinder to actuate a gate-cutting mechanism.

However, because the conventional mold incorporates hydraulic cylinders, various problems arise. The structure of the mold is complicated. During the manufacture of the mold, considerations have to be given to various mechanisms including the mechanism for sealing, e.g., high-pressure hydraulic fluid, and the mechanism for assuring pressure resistance. In addition, a great number of component parts are required. Accordingly, it is an inevitable consequence that a mold for molding optical disk substrates is relatively large, heavy, and expensive. Further, proper maintenance of the mold is difficult. Still further, when the sealing of the pressure oil happens to be inadequate, there is a risk of oil leakage, this being undesirable particularly in the case of optical disk substrates which must not be contaminated. Another problem is that, during the replacement of the mold, since the component parts that must be connected through pipe lines include not only a temperature adjusting device but also the gate-cutting hydraulic cylinder, the operation of connecting pipe lines is inevitably laborious.

SUMMARY OF THE INVENTION

The present invention has been made in order to overcome the above-stated problems. It is an object of the present invention to provide an injection molding machine from which those drawbacks resulting from the incorporation of a hydraulic cylinder in the mold are eliminated by mounting both a gate-cutting cylinder and a cylinder for ejecting a substrate and a sprue in a movable mold-mounting plate on the side that is not the side on which the mold is mounted.

To this end, according to the present invention, there is provided an injection molding machine comprising: a mold-mounting plate having a front surface allowing a mold to be mounted thereon; a gate-cutting punch slidably inserted in a hole extending through the mold-mounting plate and opening in the front and rear surfaces of the plate, the gate-cutting punch having in the center thereof a bore extending longitudinally; an ejector pin slidably inserted in the bore of the gate-cutting punch; a gate-cutting drive cylinder mounted on the rear surface of the mold-mounting plate and having a piston capable of abutting against a rear end of the gate-cutting punch, the piston being formed with a stepped bore having a large-diameter front portion and a small-diameter rear portion which are aligned on the same axial line; an ejector rod extending through the stepped bore of the piston, and having a large-diameter portion slidable within the large-diameter portion of the stepped bore, a front end of the ejector rod being capable of abutting against a rear end of the ejector pin; and a sprue-ejecting drive cylinder provided behind the gate-cutting drive cylinder on the same axial line, the sprue-ejecting drive cylinder having a piston rod connected to a rear end of the ejector rod.

DESCRIPTION OF THE PREFERRED EMBODIMENT

Figure 1:
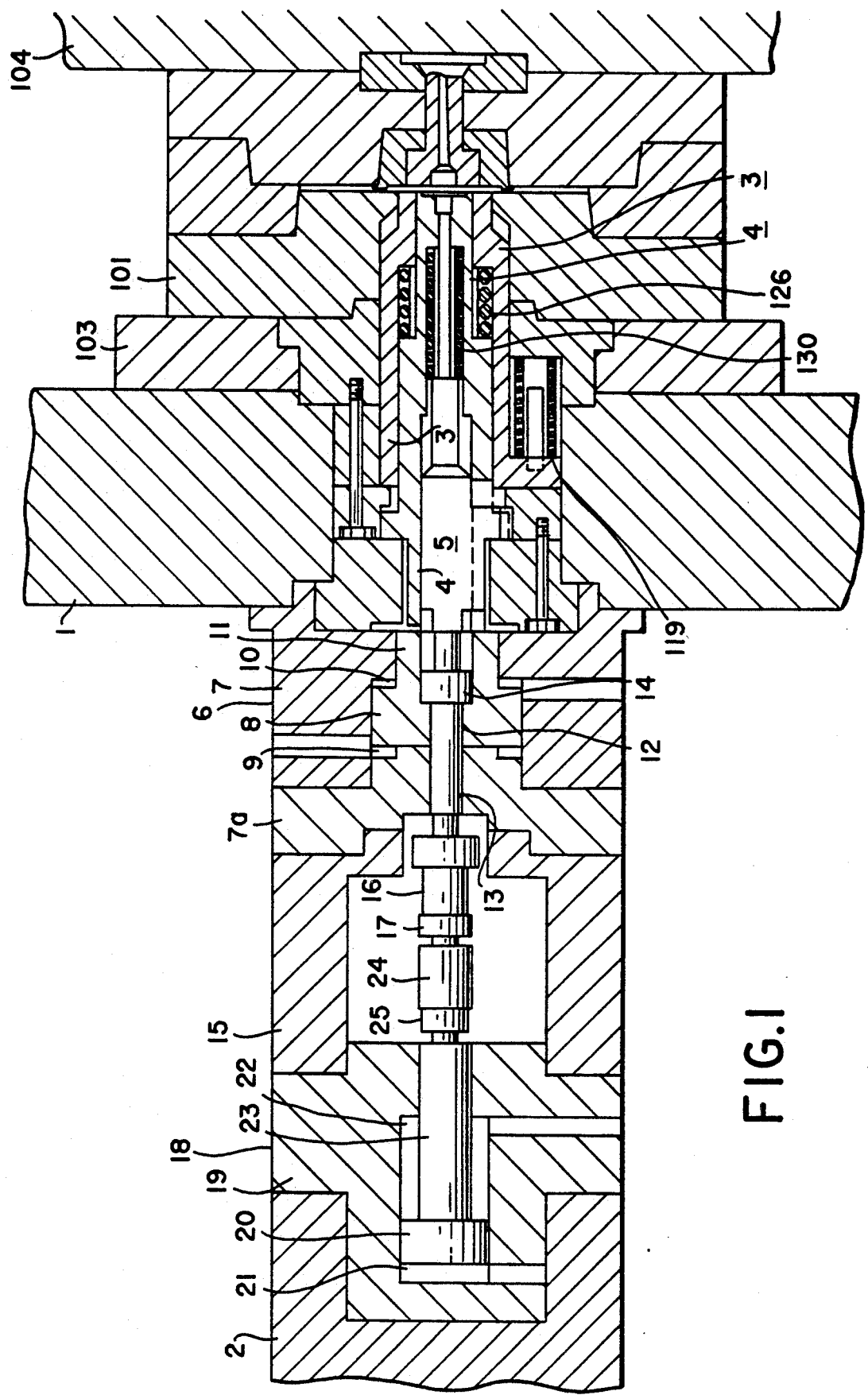
FIG. 1 is a sectional view of essential parts of an injection molding machine in accordance with one embodiment of the present invention, taken through a plane including the axis of rods of the machine.

The preferred embodiment of the present invention will now be described with reference to the drawing.

In the drawing, reference numeral 1 denotes a movable mold-mounting plate disposed in opposition to a fixed mold-mounting plate 104 in such a manner as to be movable toward and away from the fixed mold-mounting plate when moved by a mold-clamping device (i.e., a mold-clamping cylinder, in this embodiment).

A movable part of the mold is mounted on the movable mold-mounting plate 1.

In the movable part of the mold, an ejector rod 3 for ejecting a molded substrate is movably fitted in the main body 103, 101 of the mold while facing the cavity. A gate-cutting punch 4 and a sprue-ejecting ejector pin 5 are movably fitted through a longitudinal bore formed in the center of the substrate-ejecting ejector rod 3 while concentrically engaging with each other in such a manner as to be movable relative to each other. Return springs 119, 126 and 130 urge the substrate-ejecting ejector rod 3, the gate-cutting punch 4, and the sprue-ejecting ejector pin 5 with forces capable of returning these members to their most retracted positions. The arrangement of the substrate-ejecting ejector rod 3 is such that, after the sprue-ejecting ejector pin 5 has advanced toward the cavity by a certain distance (a distance greater than the gate-cutting distance), a projection 128 (See FIG. 3) of the ejector pin 5 comes into contact with the substrate-ejecting ejector rod 3 so that the substrate-ejecting ejector rod 3 advances in synchronization with the advancement of the ejector pin 5.

FIG. 1 shows the state where the movable part 103, 101 of the mold is mounted on the movable mold-mounting plate 1, and, simultaneously, the substrate-ejecting ejector rod 3, the gate-cutting punch 4, and the sprue-ejecting ejector pin 5 are inserted in a hole extending through the movable mold-mounting plate 1 while all of these members 3 to 5 are retracted to the side remote from the side on which the mold is mounted.

A gate-cutting drive cylinder 6 is mounted on the rear side of the movable mold-mounting plate 1 which is not the side on which the mold is mounted.

The drive cylinder 6 has a piston 8 movably received in a cylinder block 7, with oil chambers 9 and 10 defined behind and ahead of the piston 8, respectively.

The piston 8 has, on its side close to the movable mold-mounting plate 1, a ring-shaped abutting portion 11 capable of abutting against the gate-cutting punch 4 inserted through the movable mold-mounting plate 1 and associated with the mold. A bore 12 is formed in the center of the piston 8 in such a manner as to face the inside of the ring-shaped abutting portion 11, and has a diameter smaller than the bore defined inside the portion 11.

An ejector rod 13 is movably inserted in the piston 8. The ejector rod 13 is, at its front end, capable of abutting against the sprue-ejecting ejector pin 5 inserted through the movable mold-mounting plate 1 and associated with the mold. The ejector rod 13 has, at its intermediate position, a large-diameter portion 14. The side of this large-diameter portion 14 which is remote from the sprue-ejecting ejector pin 5 is engageable with the piston 8 so as to allow engagement between the ejector rod 13 and the piston 8.

The ejector rod 13 extends rearwardly through the cylinder block 7 and into a spacer block 15. A stroke-adjusting stopper 16 allowing the stroke of the longitudinal movement of the ejector rod 13 to be adjusted is fixed to a rear end portion of the rod 13 by means of a lock nut 17.

A sprue-ejecting drive cylinder 18 is provided concentrically with the gate-cutting drive cylinder 6 on that side of the drive-cylinder 6 which is remote from the mold, with the spacer block 15 disposed between the drive cylinders 6 and 18.

The drive cylinder 18 has a piston 20 movably received in a cylinder block 19 mounted on base 2, with oil chambers 21 and 22 defined behind and ahead of the piston 20. A piston rod 23 of the piston 20 extends frontwardly through the cylinder block 19 and into the spacer block 15.

The piston rod 23 is connected to the ejector rod 13 by means of a link nut 24, and this connection is locked by a lock nut 25.

The spacer block 15 has a hollowed out structure in which the block 15 is open on one side thereof, so that the ejector rod 13 and the piston rod 23 can be connected to each other, and the position of the stroke-adjusting stopper 16 can be adjusted, utilizing the opening.

The above-described sprue-ejecting drive cylinder 18 and the gate-cutting drive cylinder 6 are respectively controlled by independent control circuits (not shown).

The clamping device (the ram of the clamping cylinder alone is shown in the drawing) is connected to the movable mold-mounting plate 1 via the above-described gate-cutting drive cylinder 6, the spacer block 15, and the sprue-ejecting drive cylinder 18.

The operation of the machine will be described.

After the injection molding of a substrate, an ejecting operation is performed first by the gate-cutting cylinder 6. Specifically, when pressure oil is supplied to the rear oil chamber 9 while the front oil chamber 10 communicates with an associated tank (not shown), the piston 8 advances toward the movable mold-mounting plate 1. This advancement causes the ring-shaped abutting portion 11 of the piston 8 to abut against the gate-cutting punch 4 and to push the punch 4 against the force of the return spring 126. As a result, the gate-cutting punch 4 advances within the substrate-ejecting ejector rod 3 until it projects by a distance approximately corresponding to the thickness of a substrate, thereby performing a gate-cutting action.

At this time, the ejector rod 13 has its surface on the side remote from the sprue-ejecting ejector pin 5 kept in contact with the piston 8. Therefore, during the gate-cutting action, the ejector rod 13 moves together with the piston 8 toward the movable mold-mounting plate 1. In this way, the mutual relationship in position between the ejector rod 13 and the piston 8 is maintained.

Thereafter, the movable mold-mounting plate 1 is retracted to open the mold. After this mold-opening operation, an ejecting operation is performed by the sprue-ejecting drive cylinder 18. Specifically, when pressure oil is supplied to the rear oil chamber 21 while the front oil chamber 22 communicates with an associated tank, the piston 20 and the piston rod 23 advance toward the movable mold-mounting plate 1. The piston rod 23 is connected to the ejector rod 13 via the link nut 24 and the lock nut 25. Therefore, the ejector rod 13 also advances a certain distance from its position resulting from its movement together with the piston 8 until the stroke-adjusting stopper 16 abuts against the cylinder block 7a. As the ejector rod 13 advances, it pushes the sprue-ejecting ejector pin 5 against the force of the return spring 130. As a result, a sprue-ejecting action is performed.

Figure 2:
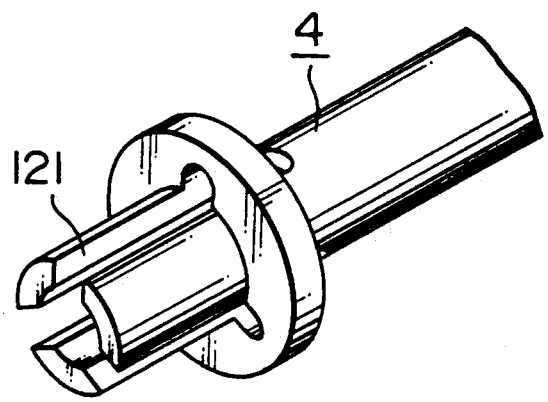
FIG. 2 is a perspective view of a part of a gate-cutting punch.
Figure 3:
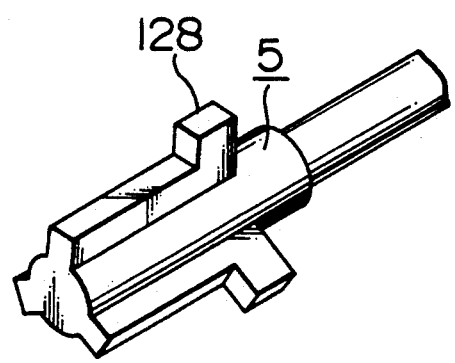
FIG. 3 is a perspective view of a sprue-ejecting ejector pin.

The projections 128 provided on the front end of rear end projections 128 of the sprue-ejecting ejector pin 5, FIG. 3, are projected outwardly through grooves 121 of the gate-cutting punch 4 (See FIG. 2) and axially move along the grooves 121 so as to be capable of abutting against the rear end of the substrate-ejecting ejector rod 3. For this arrangement, when the sprue-ejecting ejector pin 5 has advanced a certain distance (a distance greater than the gate-cutting distance), the projections 128 abut against the rear end of the substrate-ejecting ejector rod 3 so that the substrate-ejecting rod 3 advances in synchronization with the sprue-ejecting ejector pin 5. As the substrate-ejecting ejector rod 3 advances, it is brought into abutment with the inner peripheral portion of the substrate and pushes the substrate against the force of the return spring 126, thereby performing a substrate-ejecting action substantially in synchronization with the sprue-ejecting action.

After the completion of the sprue-ejecting action and the substrate-ejecting action, operations in reverse to those described above take place. Changeover valves in the control circuits for the sprue-ejecting drive cylinder 18 and the gate-cutting drive cylinder 6 are operated in such a manner that pressure oil is supplied to the front oil chamber 22 while the rear oil chamber 21 communicates with the tank, thereby retracting the spruce-ejecting drive cylinder 18. Thereafter, pressure oil is supplied to the front oil chamber 10 while the rear oil chamber 9 communicates with the tank, thereby retracting the gate-cutting drive cylinder 6. When these drive cylinders 18 and 6 are retracted in this way, the substrate-ejecting ejector rod 3, the gate-cutting punch 4, and the sprue-ejecting ejector pin 5, which are urged by the springs 119, 126 and 130 with a force capable of returning these members to their most retracted positions, automatically return to their respective initial positions.

The operation of replacing the mold is performed by dismounting the movable mold part mounted on the movable mold-mounting plate 1 and then mounting a new movable mold part. At this time, the gate-cutting drive cylinder 6 and the sprue-ejecting drive cylinder 18 do not require the operation of connecting them through pipe lines.

In the foregoing embodiment, the injection molding machine is described as used to mold disk substrates. However, this is a mere example, and it would be easily understood that the present invention is also applicable to molding machines exclusively for use in the molding of various other molded products so far as the molding of the product involves a single action.

As described above, according to the present invention, both the gate-cutting drive cylinder and the sprue-ejecting drive cylinder are mounted on the mold-mounting plate and are not provided on the same side as the mold. This arrangement is advantageous in that the work of the injection molding machine can be clearly divided between two parts of the machine, the part including the mold taking over the achievement of precise dimensions, another part of the machine taking over the drive mechanisms. This allotment of work enables the mold to be manufactured without need for considerations to be given to such mechanisms as the mechanism for sealing, e.g., high-pressure hydraulic fluid, and the mechanism for assuring pressure resistance. Accordingly, the mold can be designed and manufactured with ease, while also facilitating the addition of mechanisms for adjusting the gate-cutting distance and the ejecting distance.

Furthermore, the structure of the mold is rendered simple because such mechanism as the high-pressure hydraulic fluid sealing mechanism, and the pressure-resistance assuring mechanism are eliminated, and the number of the required component parts is reduced. Accordingly, the size and the weight of the mold can be reduced by a great extent.

Still further, the replacement of pressure-oil packings will not be necessary, the mold will not have to be disassembled so frequently as before, and the operation of establishing connection through pipe lines during the replacement of the mold will be simplified. In this way, the maintenance of the mold is facilitated by a great extent.

What is claimed is:

1. An injection molding machine, comprising:
    a mold-mounting plate having a front surface for mounting a mold thereon, a rear surface and a hole extending through said plate and said front and rear surfaces;
    a substrate ejecting rod slidably inserted in a front portion of said hole and extending through a front half and said front surface of said mold-mounting plate, said substrate ejecting rod having a bore extending longitudinally in a center thereof;
    a gate-cutting punch slidably inserted in said bore of said substrate ejecting rod and extending through said mold-mounting plate and said front and rear surfaces of said plate, said gate-cutting punch having a bore extending longitudinally in a center thereof, a sprue-ejecting ejector pin slidably inserted in said bore of said gate-cutting punch, said sprue-ejecting ejector pin having a rear end;
    a gate-cutting drive cylinder mounted on said rear surface of said mold-mounting plate and having a rear surface and a piston for abutting against a rear end of said gate-cutting punch, said piston having a stepped bore with a large-diameter front portion and a small-diameter rear portion extending axially through said piston;
    an ejector rod extending through said stepped bore of said piston and having a large-diameter portion slidable within said large-diameter front portion of said stepped bore and a small-diameter portion extending from said large-diameter portion of said ejector rod forwardly, said small-diameter portion of said ejector rod having a front end and for abutting against said rear end of said sprue-ejecting ejector pin, said ejector rod movable together with said piston as said piston moves towards said mold-mounting plate but otherwise arranged to move independently of said piston;
    a sprue-ejecting drive cylinder on said rear surface of said gate-cutting drive cylinder, said sprue-ejecting drive cylinder having a piston with a piston rod of said sprue-ejecting drive cylinder piston engagable with a rear end of said ejector rod; and
    transmitting means for transmitting forward movement of said sprue-ejecting ejector pin to said substrate ejecting rod to move the substrate ejecting rod forwardly as said sprue-ejecting ejector pin moves forwardly by a predetermined distance.

2. An injection molding machine according to claim 1, wherein said transmitting means comprises projections on said sprue-ejecting ejector pin and projecting radially thereon, longitudinal grooves formed through said gate-cutting punch and said projections extend outwardly therethrough, and wherein a rear end of said substrate ejecting rod abuts against said projections.

* * * * *